Dec. 17, 1940. J. W. McNEIL Re. 21,662
ADJUSTABLE CLOSURE FOR CONTAINERS
Original Filed March 24, 1936
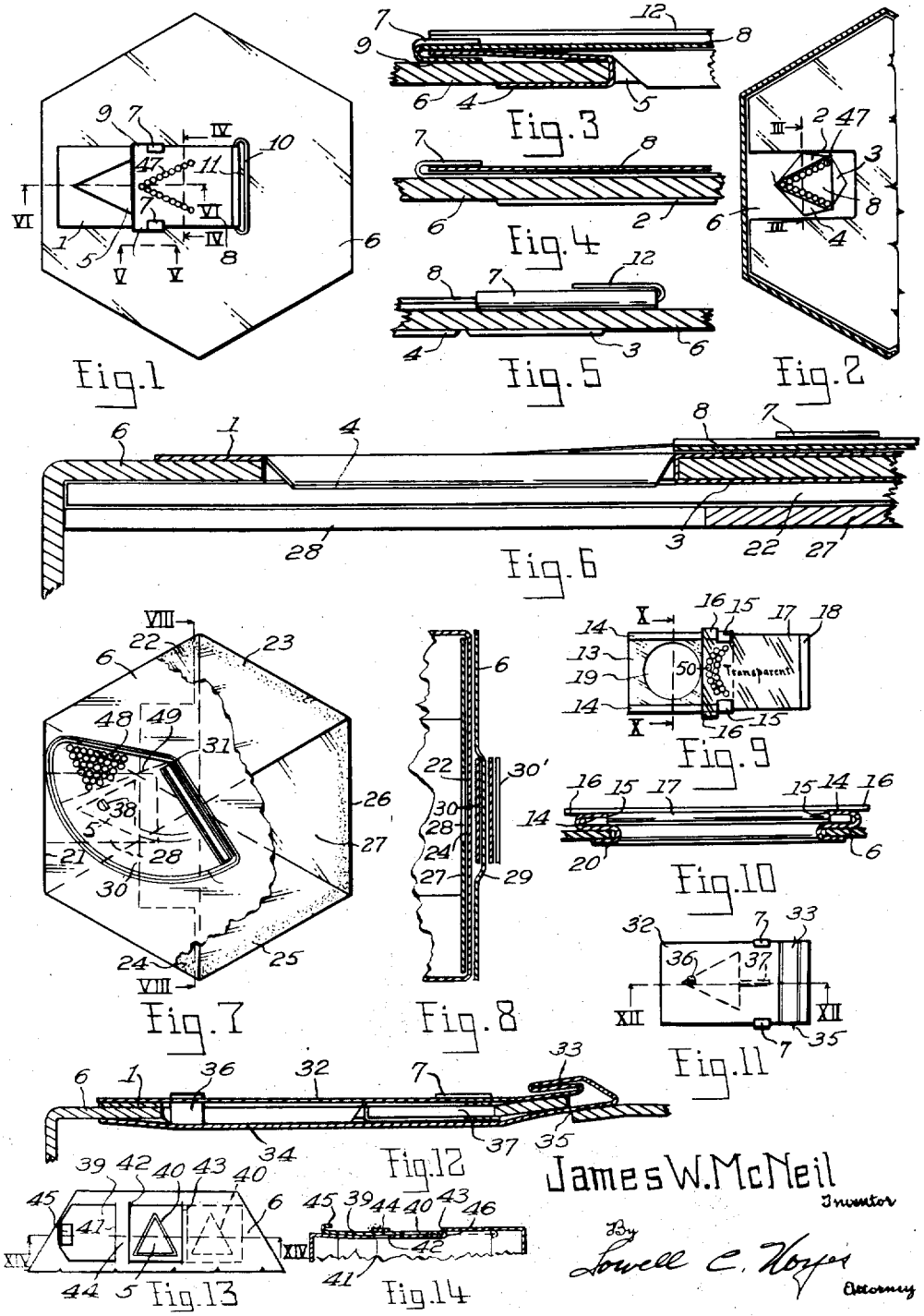
James W. McNeil
Inventor
By Lowell C. Noyes
Attorney Reissued Dec. 17, 1940

Re. 21,662

UNITED STATES PATENT OFFICE 21,662

ADJUSTABLE CLOSURE FOR CONTAINERS

James William McNeil, Hoboken, N. J., assignor, by mesne assignments, to W. F. Straub & Company, Chicago, Ill., a corporation of Illinois Original No. 2,170,335, dated August 22, 1939, Serial No. 70,600, March 24, 1936. Application for reissue May 24, 1940, Serial No. 337,079

16 Claims. (Cl. 221—62)

This invention relates to containers of the type from which the contents may be poured through a suitable discharge opening at one end.

One of the objects of the invention is to provide a pouring opening in a member which serves as a guide and holder for a sliding closure member which may also be made of metal, or of any other suitable material.

From one aspect, another object of the invention is to provide a closure member adapted to be secured in position within or upon the blank portion which serves as the top member of one of the types of cartons which are shipped in the knocked-down form from box factory to the place where the cartons are filled, the closure being out of the way of the adhesive which is used in sealing the top on the package after it is filled.

Another object of the invention is the provision of a closure member which will seal the opening on both the inner and the outer surface when closed, which will provide sifting openings when partly opened, and which will fully uncover the pouring opening when drawn to its limit of outward movement.

Still another object of the invention is to provide a pouring container having a discharge-controlling closure device including an easily manipulable slidable closure member or cover and means for guiding the sliding movements of the cover, a handle on the cover facilitating finger operated opening and closing movements thereof and cooperating with the guiding means to define the limit of movement of the cover in one direction.

Other objects of the invention, such as simplicity, ease of manufacture, low cost, and efficiency, will appear in connection with the description of several typical embodiments of my invention chosen for purposes of illustration and shown in the accompanying drawing, in which Figure 1 is a plan view of the top of a container with the sliding closure or cover in open position.

Fig. 2 is a bottom plan view of the same container top with the closure slid to the position in which the sifter openings are in registration with the pouring opening.

Fig. 3 is a fragmentary sectional view on a much larger scale of the portion of the carton at one side of the pouring opening on about the broken line III—III in Fig. 2 showing a modification in which the loop handle is omitted and an integral handle substituted therefor.

Fig. 4 is a fragmentary sectional view on the same scale as that of Fig. 3 looking in the direction of the arrows at the end of the broken section line IV—IV of Fig. 1.

Fig. 5 is a fragmentary sectional view on approximately the line V—V of Fig. 1, of the modification shown in Fig. 3 in which the loop handle is omitted from the sliding closure which is shown in closed position with the substitute handle engaging the closure-guiding lugs.

Fig. 6 is a fragmentary longitudinal section on the line VI—VI of Fig. 1.

Fig. 7 is a top plan view with portions broken away of a modified form of the invention in which the closure swings through an arc.

Fig. 8 is a sectional view on approximately the broken line VIII—VIII of Fig. 7.

Fig. 9 is a plan view of a guide and closure member, the container top not being shown, of another modification.

Fig. 10 is a fragmentary sectional view on an enlarged scale on the line X—X of Fig. 9.

Fig. 11 is a plan view of the closure member of another modification, only the lugs of the guide member beneath being shown, and the container top being omitted.

Fig. 12 is a fragmentary longitudinal section on an enlarged scale of the modification shown in Fig. 11, taken on approximately the broken line XII—XII of Fig. 11, but indicating the guide member in section.

Fig. 13 is a fragmentary plan view of a still further modification; and

Fig. 14 is a longitudinal sectional view on the section line XIV—XIV of Fig. 13.

A closure device constructed according to the present invention controls the opening through which material is to be poured from within the associated container and is adapted to be selectively opened or closed by a finger. The device includes a member relatively fixedly connected to the container and providing the pouring opening through which the container contents may pass. The fixed member serves as a guiding means for a slidable closure or cover member which is adapted to be selectively moved into open or closed relation to the outlet. The cover member may be connected in assembled relation with the fixed member and guided for opening and closing movement by means such as sets of lugs or tongue-like flanges which may form part of either or both of the fixed and cover members. A handle on the cover member may engage the guiding lugs of the fixed member to limit the sliding movement in one direction, while interengagement of the guiding and connecting lugs or flanges on the members may serve to limit sliding movement of the cover member in the opposite direction. For example, the handle may be located at the rear end of the cover member and the fixed member may have the guiding lugs thereof located to engage the handle when the cover member is closed; and the connecting and guiding flanges on the cover member may be formed at the front end thereof so that the respective lugs and flanges will engage as stops in the fully open position of the cover member. Sifter openings may be formed in the cover member to register with the outlet through the fixed member when the cover member is slid to a position intermediate the fully open and fully closed positions thereof.

In the embodiments of the invention shown in Figs. 1 to 5, the fixed or guiding member of the closure device may be formed of a metallic strip 1 which is cut by radiating slits to form three tongues or flanges 2, 3, and 4 by which the member is secured in position upon the selected container such as a pasteboard carton. The tongues are inserted through an opening 5 formed in the carton top 6 and bent out around the edges of the opening into close contact with the inner surface of the top 6 and the outer portions of the strip 1 provide flanges having their edges extending away from the opposite sides of the opening. These tongues will hold the thin strip 1 securely in place while permitting its outer edges to lift slightly from the upper surface of the top. Substantially the entire periphery of the pouring opening 5 is covered by the tongues and no material from within the package can pass between the tongues and the top 6. At its rear corners, the strip 1 has means such as lugs 7, 7, which are bent upward and inward to act as guides and stops for a sliding closure member 8. The member 8 slides longitudinally beneath the lugs 7 and has at its front corners similar means such as lugs or flanges 9, 9, extending outwardly. In this particular embodiment of the invention, the lugs 9, 9, are also bent downward and inward to engage the lateral edges of the strip 1.

The strip 1 lies in close surface contact with the member 8 at all points in the path of travel of the closure member and the lugs 7 lie in the path of travel of the lugs 9 to interengage therewith and act as stops to prevent withdrawal of the closure member from the guide strip as it is moved to open position.

It is a feature of the invention to have a handle on the closure member 8 to facilitate operation by the finger in controlling the position thereof and also to function in defining the limit of movement of the closure member in one direction. In Fig. 1, the closure member 8 is shown as having a wire loop 10 constituting a handle which is pivotally secured to the member 8 at its rear end by a rolled-over portion 11 and which preferably extends beyond the side edges of the member 8. The handle 10 normally lies flat on the top 6 but may be swung up on its pivotal connection to act as a handle for engagement by the finger of the user in sliding the closure open or shut. Because the handle 10 extends beyond the side edges of the member 8 it will engage the lugs 7 on closing movement of the member 8 and is therefore adapted to serve as means for limiting inward sliding or closing movement of the cover member 8.

In the modification shown in Figs. 3 and 5, the loop 10 is omitted and the rear end of the member 8 is merely formed into a forwardly extending flange 12 which may serve as a handle and will engage the lugs 7 to limit the closing movement of the closure.

Another modification of the invention is illustrated in Figs. 9 and 10, in which the guide strip 13 has a narrow flange 14 bent upward and inward for almost the entire length of the strip to receive the side edges of the closure strip, extensions 15 of the same flange being formed at the rear end to engage stop lugs 16 at the front end of the transparent closure strip 17, the rear end of which may be bent up at 18 to form a flange for the finger of user to pull the member to the rear to uncover a circular opening 19 formed in the strip 17 or to push the closure forward to close the opening.

In punching out the circular opening 19, the metal is left with a cylindrical flange 20 around the opening, and after the strip 13 is placed in position on the top 6 with the flange passing through a similar opening formed in the top 6, the metal of the flange is flared out by a tapering tool and pressed into firm contact with the inner face of the top 6 in the manner usual in forming metal eyelets or grommets.

A further modification is shown in Fig. 7 in connection with a familiar form of carton in which a hexagonal top 6 hinged at one side as at 21 is secured by adhesive to flaps 22, 23, 24, and 25, each approximately in the form of an equilateral triangle, and each hinged to its respective wall side, the top 6 also being secured by adhesive to the hinged side 26 of an inner flap 27 which has a portion cut out at 28 opposite the pouring opening 5 in the finished carton to avoid interference with the pouring out of the contents. This top 6 is shown as embossed at 29 enough to hold an inner closure member 30 away from the adhesive which is usually applied to the cover member 6 before it is folded over and pressed down upon the flaps 21, 22, 23, 24 and 26.

The member 30 is conveniently formed in one piece with an outer closure member 30′ which slides on the upper surface of the embossed portion of the top 6 by partial rotation around the corner at 31. The metal connecting the members 30 and 30′ may be folded in the manner illustrated at the right in Fig. 12, which is a sectional view of a similar closure which slides in a straight line instead of swinging around a pivotal point. In each form, the top 6 has a slit cut therein through which the inner member slides in and out.

In Fig. 11, the outer member 32 is folded at its rear end as indicated at 33, for convenient engagement by the finger of the user and the inner member 34 passes through the slot 35 and lies substantially parallel with the outer member throughout the greater portion of its length. At its front end, the inner member has a struck-up tongue 36 which is passed through a slot or slit in the outer member and bent over to hold the two members together. A metallic guide plate 1 having rear lugs 7, which may be identical with the same member in Fig. 1, is secured within the opening 5, the plate having a rearwardly extending slot 37 to receive the tongue 36 when the members 32 and 34 fully uncover the opening 5. The opening and closing movements of the cover member 32—34 may be limited by engagement of the connecting element 36 with the member 1 at the rear and front, respectively, of the pouring opening.

The inner and outer members in Fig. 7 are also connected by a similar tongue and slit connection indicated at 38.

The sliding member 39, in Figs. 13 and 14, consists of a single strip of metal having near one end a perforation 40 of substantially the same size as the opening 5. The top 6 in this modification is provided with three slits, 41, 42, and 43, the strip passing beneath the material between the slits 41 and 42 as shown at 44 and over the material between the slits 42 and 43, the opening 5 lying between these two last-mentioned slits. Thus, the perforation 40 in the strip will lie in registration with the opening 5 when the strip is at one end of its sliding movement, as shown in full lines, and the unperforated portion of the strip near the other end will cover the opening 5 when the strip is slid to the opposite limit of sliding movement, as indicated by the broken lines. The bent-over ends 45 and 46 act as stops at the limit of movement, the outer end 45 also serving for engagement by the finger of the user. In the closed position, the opening 40 is on the inside of the carton beneath the top. The top portion 44 in this form of device acts as the guide member for one end of the strip and the material at the ends of the slit 43 serves to guide the other end, the closure member lying partly inside of the top and partly outside. A corresponding action occurs in Fig. 7, the end of the slot forming the guide for the curved edge of the swinging closure.

Where it is desired to provide for sifting of fine material held in the container, rows or groups of perforations of any suitable size will be formed in the portion of the closure slide which will first move across the pouring opening as the sliding member is moved from its fully closed position. Thus, in Fig. 1, a row of openings 47 is formed parallel with each of the two front edges of the V-shaped opening 5 and as soon as the closure member 8 is slid a short distance, these openings will lie opposite the pouring opening 5 in the top, as indicated in Fig. 2. In Fig. 7, the perforations 48 are arranged in a group large enough to cover the entire opening 5 as soon as the closure members 30, 30' are swung through an arc slightly greater than the width of the opening 5. The broken line 49 indicates the front edge of the inner closure member 30, which has a sufficient angular extent to form a complete closure of the inside of the opening 5 when in the closed position but is of less extent than the outer member 30' in which are the openings 48. In the slide 17, perforations 50 are shown arranged in arcs which in the closed position will lie just in advance of the circular opening 19. A transparent slide will not ordinarily be used with materials which need to be sifted, and these perforations may, of course, be omitted, as is also the case in the slide 32 of Fig. 11 and the slide 39 of Fig. 13.

It will be evident that the closure members of the types shown in Fig. 1, Fig. 7, Fig. 9, Fig. 11 and Fig. 13 will not be injuriously affected by any possible contact with adhesive applied to the inside surface of the top member 6 when sealing up the carton after it is filled. They can be applied at the box factory when the pasteboard is prepared as a knockdown container and will not interfere with the shipment of such cartons, as flat bodies.

The description of the various embodiments of the invention is to be taken as illustrative and not in a limiting sense since it will be evident that many changes in form, size, proportion of parts, and mode of construction may be made without departure from what is claimed.

I claim as my invention:

1. In combination with a container having an opening in the wall thereof, a guide member mounted upon the outer surface of said wall and secured to said wall by portions of said guide member extending through said opening and engaging the inner surface of said wall around the periphery of said opening, a sliding closure member arranged for reciprocation on the outer surface of said guide member, means on said guide member for engaging the lateral edges of said closure member to hold it in contact with said guide member at its rear end when closed and means near the front end of the closure member adapted to hold it in sliding contact with the said guide member.

2. A construction as in claim 1, the sliding closure member having a portion passing through the wall into the container through a slit formed at one side of said opening, the portion of the closure member within the container wholly closing the said opening when the said member is in the closed position.

3. A container having an opening formed in a wall thereof and having a slit formed in the wall at one side of the opening, a sliding closure member having a portion slidably engaging the outer surface of said wall and having another portion in opposed spaced relation to the first mentioned portion passing through the slit to engage the inner side of the wall, the portion of the closure member within the container wholly closing said opening when the said member is in closed position.

4. In combination with a container, a member having an opening for material to be poured from the container, a sliding closure member for said opening, means for guiding the sliding movements of said closure member and holding the members together in their operative relationship, and a loop pivotally carried by said closure member adapted to lie flat when not in use and to be swung on its pivotal connection to serve as a handle for sliding the closure member open or closed, said loop being engageable with said guiding means to limit the sliding movement of said closure member in one direction.

5. In combination with a container, a member having an opening for material to be poured from the container, a sliding closure member for said outlet, means for guiding the sliding movements of said closure member, and a pivoted handle adapted normally to lie substantially flat but being swingable into position to be engaged for slidably manipulating said closure member, said guiding means and said handle being interengageable for limiting the sliding closing movement of said closure member.

6. In combination with a container, a member having an opening permitting passage of material therethrough, a sliding closure, means on said member to guide the opening and closing movements of said closure, a pivoted handle on said closure to facilitate sliding manipulation thereof and adapted to lie flat on said member in the closed condition of the closure, and means on said closure engageable by said guiding means for limiting movement of said closure in one direction, said handle being engageable with said guiding means for defining the limit of movement of the closure in the opposite direction.

7. A container comprising, in combination, a closure device including an opening through which material from the container may be poured, means providing edges extending in parallel relation but on respectively opposite sides of said opening, a slidable member for closing said opening, means for guiding the sliding movements of said member, and means longitudinally spaced on said member for limiting the movement of said member in opposite directions, one of said longitudinally spaced means constituting a handle to facilitate manipulation for effecting sliding movements of said member and being engageable with said guiding means in the movement limiting action thereof, and the other of said longitudinally spaced means comprising lugs turned under into sliding engagement with said edges and engageable with said guiding means for limiting movement of the slidable member in the opposite direction from said handle.

8. In combination in a closure arrangement for pouring containers, means providing a pouring opening and including laterally extending members at the respectively opposite sides of the opening, a slidable cover for said opening including lugs at the sides of the forward end portion of the cover turned under into sliding engagement with said laterally extending members for guiding the cover, and guiding lugs on said means turned over into sliding engagement with said cover rearwardly of said turned under lugs.

9. In combination with a container having an opening in the wall thereof, a guide member having central portions thereof extending inwardly through the opening and bent outwardly over the material forming the periphery of said opening and in contact with the inner surface of the wall to form a tight closure between the guide member and the wall, a closure member slidable upon the outer surface of said guide member, and means upon one of said members engaging the other member to hold them in operative relation, said closure member having a metallic loop pivoted at its rear end to lie flat on the container when at rest and adapted to swing on its pivotal connection for engagement by the finger of the user and also to engage the guide member to limit inward sliding movement of the closure member.

10. In combination with a container, means providing an outlet for material poured from within the container, a sliding cover formed of sheet material guided for opening and closing movement relative to said outlet, said cover comprising two portions, and means comprising an integral part of the cover extending angularly to both of said portions and connecting the portions together in a predetermined relationship, said means having engagement with a part of said outlet means to limit movement of said cover member in one direction.

11. A container including, in combination, means providing a pouring opening, and a sliding cover for said opening guided for opening and closing movement and comprising two portions, said cover including an element bent out of the material thereof at an angle to said portions and connecting the latter together, said element being engageable with a part of said means for limiting the closing movement of the cover.

12. A container including, in combination, means providing a pouring opening, a sliding cover for said opening guided for opening and closing movement and comprising two portions, and an integral part of said cover holding said portions together, said part extending at an angle to said portions and being disposed to engage with a predetermined part of said means to define the fully open position of the cover.

13. In combination with a dispensing container, a metallic guide member having portions struck up at opposite sides of a pouring opening and bent outwardly, a closure mounted for sliding contact with the outer surface of said guide member and having inturned flanges engaging the outer edges of said guide member for maintaining the members in sliding association, inturned flanges on said guide member engaging the lateral edges of the closure member and interengageable with the inturned flanges of said closure member for halting movement of said closure member in one direction.

14. In combination with a pouring container, a member providing a pouring opening and having means projecting outwardly adjacent to said opening, a slidable cover for said opening, guiding means on said cover and turned inwardly relative to the cover for engaging slidably with said outwardly projecting means, and means on said member engaging over said cover and cooperating with said guiding means in guiding the sliding movements of said cover.

15. In combination in a closure arrangement for pouring containers, means providing a pouring opening for the associated container, a slidable cover for said opening formed of sheet material bent at an intermediate point into two opposed sections arranged to lie on respectively opposite sides of said means, the outer of said sections having a portion folded to provide a handle for convenient engagement by the finger of the user in moving the cover between the open and closed positions, means on the forward part of said cover for holding the sections in predetermined relation to one another and engageable with said first-mentioned means at the pouring edge of the opening to determine the closed position of the cover, and means for guiding the sliding movements of the cover located forwardly of the position assumed by said handle when the cover is closed.

16. In combination with a dispensing container, means providing a pouring opening and having flanges at opposite sides of said opening with their edges extending away from the opening, a cover for said opening arranged to be manipulated for sliding movement over said means, flanges on said cover extending inwardly therefrom into sliding engagement with said first mentioned flanges for guiding the opening and closing movements of said cover, and additional means rearwardly of said opening cooperating with said flanges for guiding said cover.

JAMES WILLIAM McNEIL.